(12) United States Patent
Moore et al.

(10) Patent No.: US 6,431,422 B1
(45) Date of Patent: Aug. 13, 2002

(54) BICYCLE ACCESSORY MOUNTING APPARATUS

(76) Inventors: David B. Moore, 75 Hobart St.; Charles L. Moore, 44 Princeton St., both of Danvers, MA (US) 01923

( * ) Notice: Subject to any disclaimer, the term of this patent is extended or adjusted under 35 U.S.C. 154(b) by 0 days.

(21) Appl. No.: 09/798,590

(22) Filed: Mar. 3, 2001

(51) Int. Cl.⁷ .................................................. B62J 7/00
(52) U.S. Cl. .................... 224/427; 224/443; 224/448; 224/451; 224/461; 280/202; 280/293; 280/295; 280/297; 297/195.13
(58) Field of Search ................................ 224/427, 443, 224/447, 448, 450, 451, 461, 462; 280/202, 288.4, 293, 295, 297; 297/195.13, 243; 248/229.16

(56) References Cited

U.S. PATENT DOCUMENTS

| | | | |
|---|---|---|---|
| 660,615 A | * 10/1900 | Bauer | 224/425 X |
| 1,058,229 A | * 4/1913 | Futhey | 224/442 X |
| 4,736,921 A | * 4/1988 | Zane et al. | 248/316.2 |
| 4,966,382 A | 10/1990 | Giles | |
| 5,167,353 A | 12/1992 | Hughes | |
| 5,303,944 A | 4/1994 | Kalmus | |
| 5,332,134 A | * 7/1994 | Chen | 224/443 X |
| 5,386,961 A | 2/1995 | Lu | |
| 5,458,308 A | 10/1995 | Lin | |
| 5,647,520 A | * 7/1997 | McDaid | 224/425 |
| 5,653,500 A | 8/1997 | Amore | |
| 5,662,255 A | 9/1997 | Lu | |
| 5,704,526 A | * 1/1998 | Kuo | 224/425 |
| 5,845,830 A | * 12/1998 | Dreiling | 224/415 |
| 5,850,958 A | * 12/1998 | Belanger et al. | 224/415 |
| 5,860,577 A | * 1/1999 | Dunn | 224/453 |
| 5,890,759 A | 4/1999 | Ross | |
| 5,961,015 A | * 10/1999 | Shirakawa | 224/442 |
| 6,120,050 A | 9/2000 | Tillim | |

* cited by examiner

Primary Examiner—Stephen K. Cronin
(74) Attorney, Agent, or Firm—Perkins, Smith & Cohen, LLP; Jerry Cohen; Peter J. Borghetti

(57) ABSTRACT

A bicycle accessory mounting apparatus for releasably securing a bicycle accessory quickly and effectively to a bicycle seat post. The bicycle accessory mounting apparatus comprises a block having two holes, two gaps, and two snap lock quick connect mechanisms at opposing ends.

8 Claims, 10 Drawing Sheets

BICYCLE ACCESSORY MOUNTING APPARATUS

CROSS REFERENCES TO RELATED APPLICATIONS

None.

STATEMENT REGARDING FEDERALLY SPONSORED RESEARCH OR DEVELOPMENT

Not Applicable

REFERENCE TO A MICROFICHE APPENDIX

Not Applicable

BACKGROUND OF THE INVENTION

The present invention is directed toward an improved bicycle accessories mounting device for carrying various bicycle accessories, including but not limited to, a learn-to-ride balance handle, saddle bags, tool kit, back-pack holder, a child carrier, as well as other after market accessories. The device is secured to the bicycle seat post of any type of bicycle. Accessories are attached to the device securely and safely held under any type of terrain conditions.

One application of the present invention overcomes the problems and disadvantages of training wheels or other means of supporting an individual learning to ride a bicycle. The bicycle accessory mounting apparatus in combination with a training handle allows a supervising or teaching individual to walk or run along with learning individual maintaining balance and support. The adjustable handle also provides improved ergonomics for the trainer. The present invention will benefit individuals with back problems who still wish to be part of the learn to ride process with their children by means of allowing proper posture and skeletal alignment while supporting learning subject.

Other applications of the present invention overcome the problems and disadvantages of cargo carriers and child seats attached to bicycles. The present invention's simple attachment mechanisms make for time saving conversions compared to existing devices that are attached to bicycle frames and handle bars.

BACKGROUND—DESCRIPTION OF PRIOR ART

There has been a significant increase in the popularity of bicycling over the past few years. People use bicycles not only for a leisurely spin around the block on a sunny Sunday afternoon, but as a primary source of transportation to commute to work, for offroad excursions, and for long distance trips. As the use of bicycles increase, the need for bicycle accessories also increases. From a consumer viewpoint, there is a need for an accessory to perform more than one function. Such functions include bicycle training and a carrier of children and cargo. Therefore, the potential users of such accessories range from the novice bicyclist to the most experienced bicyclist.

The need for a bicycle-training device has been around since the first bicycle was manufactured over one hundred years ago. There are many bicycle-training devices available and known in the art. Some are attached to the rear wheel axial. Others are attached to the rear frame behind the seat. Still others are attached to the seat post.

Those devices attached to the seat post have the added flexibility to pivot such that the trainer can be positioned either on the left side, right side or behind the trainee. U.S. Pat. No. 6,120,050 to Stephen L. Tillim (Sep. 19, 2000) is a one-piece bicycle-training device that can be positioned to vary the relative position of trainer along the side of the bicycle, but the height of the trainer's handle is not adjustable. A short or tall trainer will be forced to stretch or bend into position adequate to control the balance of the beginning bicyclist. In this case, the trainer's physical well being, as well as the beginning bicyclist, is at risk with this device. Another seat post attached bicycle training device is U.S. Pat. No. 5,303,944 to Allan L. Kalmus (Mar. 19, 1994). The device has an adjustable trainer's handle for the varying height and physical limitations of the trainer, but is a multiple piece construction with a complex handle attachment mechanism. Yet another seat post attached bicycle-training device is U.S. Pat. No. D384,602 to Donald P. Anderberg (Oct. 7, 1997). It is a one-piece construction, but the height of the trainer's handle is not adjustable. None of these devices have applications other than bicycle training. None of these accessories have more than one function.

The major draw back to bicycle transportation has been the limitations of carrying essential items. Bicyclists have relied on backpacks, small pouches attached to the handle bars, small carriers mounted over the rear wheel, and the like, to carry only the bare essentials. For long distances, the backpack will fatigue the rider resulting in a trip taking much longer than expected. There is also the possibly of injury to the bicyclist from prolonged carrying of the backpack and from a fall while carrying the backpack. Small pouches attached to the handlebars may impair the bicyclist's ability to steer or brake. Also, the pouches can only carry a few items, such as a tool kit. This limited carrying capability is inadequate for any bicycle trips longer than a few hours. The small carriers mounted over the rear wheel are limited to holding a small bag or backpack, but is plagued with a balancing problem.

Examples of carrying devices attached to the seat post currently known in the art are lock holders. U.S. Pat. No. 4,966,382 to Vincent B. Giles (Oct. 30, 1990) is a multi-piece construction with pivotal members to engage a shackle. U.S. Pat. No. 5,167,353 to Jack I. Hughes (Dec. 1, 1992) is a one-piece construction with a C-shaped channel to hold a U lock. U.S. Pat. No. 5,458,308 to Wen-Yii Lin (Oct. 17, 1995) is a multi-piece construction. U.S. Pat. No. 5,386,961 to Francisco Lu (Feb. 7, 1995) is a multi-piece construction with a complex nuts & bolts sacrament. Other one-piece construction lock holder is U.S. Pat. No. 5,662,255 to Chien-Chzh Lu (Sep. 2, 1997). These devices are one or multi-piece construction designed exclusively for "U" locks or shackles. None of these devices have applications other than carrying a lock or shackle. None of these accessories have more than one function.

As with all the above devices, child carriers that attach to the seat post require special hardware dedicated to the child's seat. Two such child seats, U.S. Pat. No. 5,890,759 to David B. Ross (Apr. 6, 1999) and U.S. Pat. No. 5,653,500 to Anthony Amore (Aug. 5, 1997), are relatively complex in design with multiple parts. Therefore, these two devices have no other applications other than carrying a child's seat.

The present invention addresses the deficiencies of the prior art by providing a multifunctional, one-piece, simple, and reliable apparatus. The present invention is adaptable to a bicycle trainer with the addition of a trainer's handle. The present invention is adaptable to existing cargo or child carriers with the addition of the accessory shaft.

BRIEF SUMMARY OF THE INVENTION

The present invention comprises a mounting bracket having two holes with snap lock quick connects that mount to bicycle seat post by quick connects. The first hole is sized to be received by the seat post. The mounting bracket is removably clamped to the seat post upon the closure of the first quick connect. The second hole is sized to receive a bicycle accessory post. The bicycle accessory post is removably clamped to the mounting bracket upon the closure of the second quick connect.

An object of the present invention is to provide a bicycle accessory mount that is low cost, light weight, low maintenance, and easy to use.

Another object is to provide a bicycle accessory mount that is multifunctional, flexible, and rugged.

Another object is to provide a bicycle accessory mount that is used as a bicycle-training device, as a cargo carrier, and as a child carrier.

Another object is to provide a bicycle accessory mount that is quick to convert from one accessory to another.

Another object is to provide a bicycle accessory mount that will aid in the learning-to-ride process of youngsters, with an improved balance control to reduce the risk of injury to the trainer and trainee due to falls, with an adjustable balance arm for bicycle trainers to adjust handle height and position along side of the bicycle to improve balance control, and that reduces the training cycle.

Another object is to provide a mounting platform mount for various other accessories.

Still further objects and advantages will become apparent from a consideration of the ensuing description and accompanying drawings.

Figure 1:
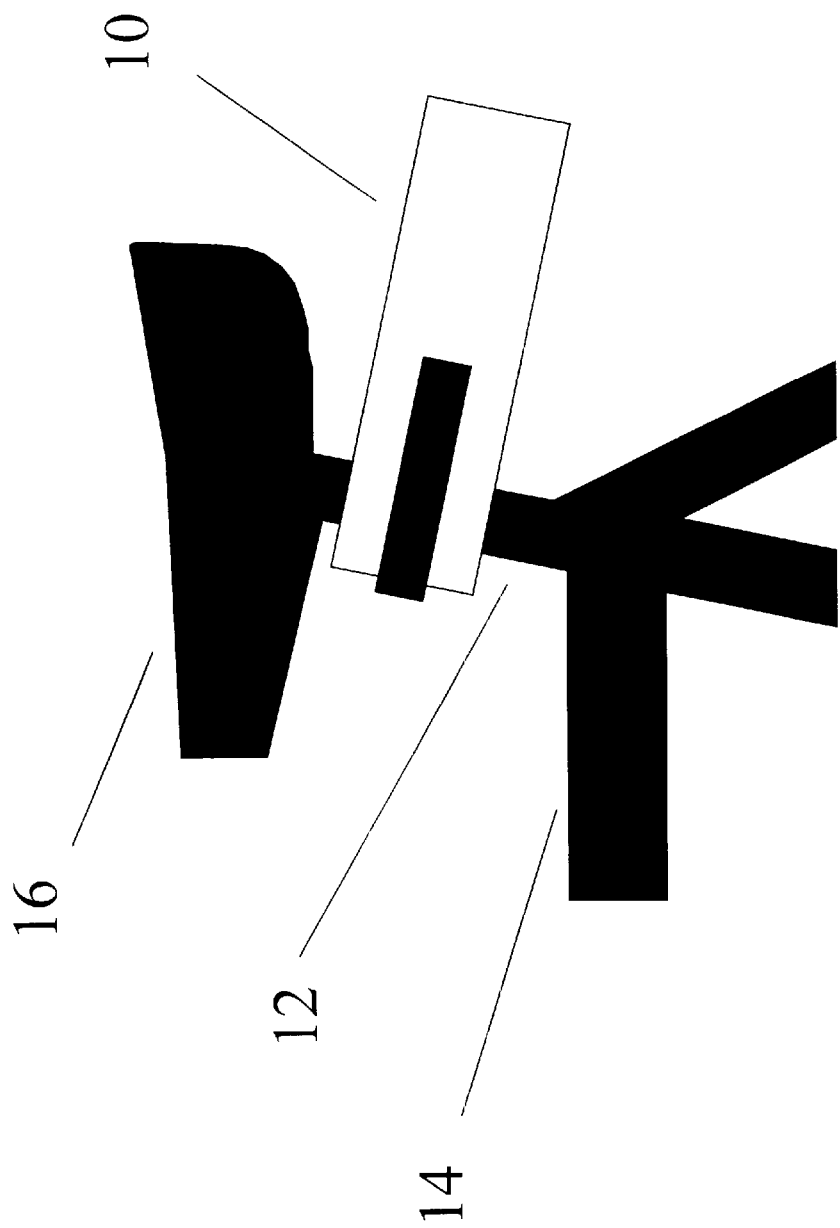
FIG. 1 is a view of the bicycle accessory mounting apparatus shown attached to the bicycle seat post on a partial view of a bicycle

REFERENCE NUMERALS 10 bicycle accessory mounting apparatus
12 bicycle seat post
14 bicycle
16 seat
18 accessory shaft
20 bicycle training handle
22 child bicycle seat
24 cargo carrier
26 block
28 top surface
30 bottom surface
32 first end
34 second end
36 third side
38 fourth side
40 first hole
42 second hole
44 first hole diameter
46 second hole diameter
48 first hole angle
50 second hole angle
52 first gap
54 second gap
56 locking device
58 upper side
60 lower side
62 threaded member
64 member hole
66 handle portion
68 grip
70 shaft angle
72 accessory receiving end
74 child seat
76 cargo container
78 accessory shaft first end
80 accessory shaft second end
82 handle portion first end
84 handle portion second end

PREFERRED EMBODIMENT—DESCRIPTION

Figure 2:
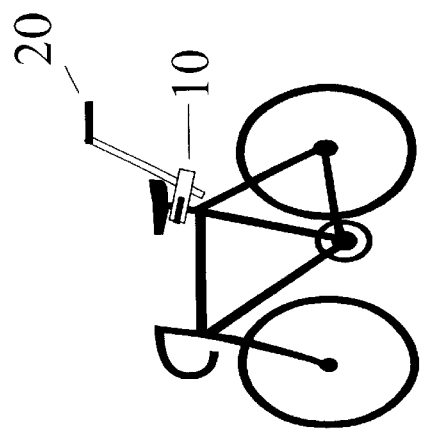
FIG. 2 is a view of the bicycle accessory mounting apparatus with the accessories shaft attached
Figure 3:
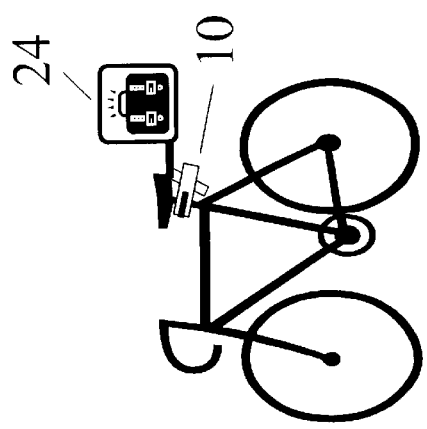
FIG. 3 is a view of the bicycle accessory mounting apparatus with a bicycle-training handle attached
Figure 4:
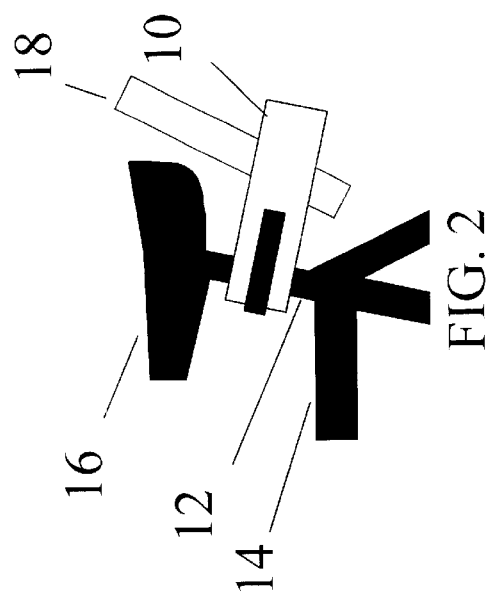
FIG. 4 is a view of the bicycle accessory mounting apparatus with a child's seat attached
Figure 5:
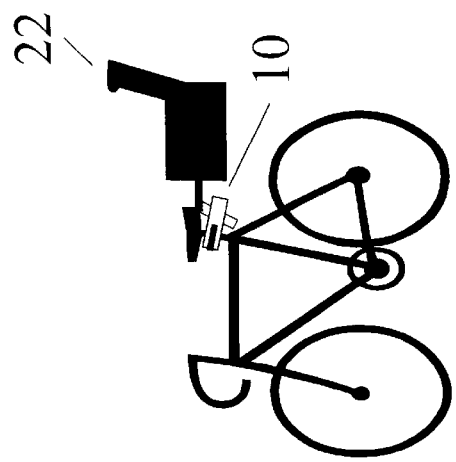
FIG. 5 is a view of the bicycle accessory mounting apparatus with a cargo carrier attached

Referring to FIG. 1, a bicycle accessory mounting apparatus 10 is connected to a bicycle seat post 12 that couples the bicycle accessory mounting apparatus 10 to a bicycle 14 (partially shown). The bicycle accessory mounting apparatus 10 is positioned below the seat 16 at a vertical height sufficient to receive the accessory shaft 18 (see FIG. 2) without interference by the seat 16. As illustrated in FIGS. 3, 4, and 5, the bicycle accessory mounting apparatus 10 is used in combination with a bicycle training handle 20, child bicycle seat 22, and a cargo carrier 24. Other accessories not mentioned herein are also to be contemplated and within the scope of the present invention.

Figure 6:
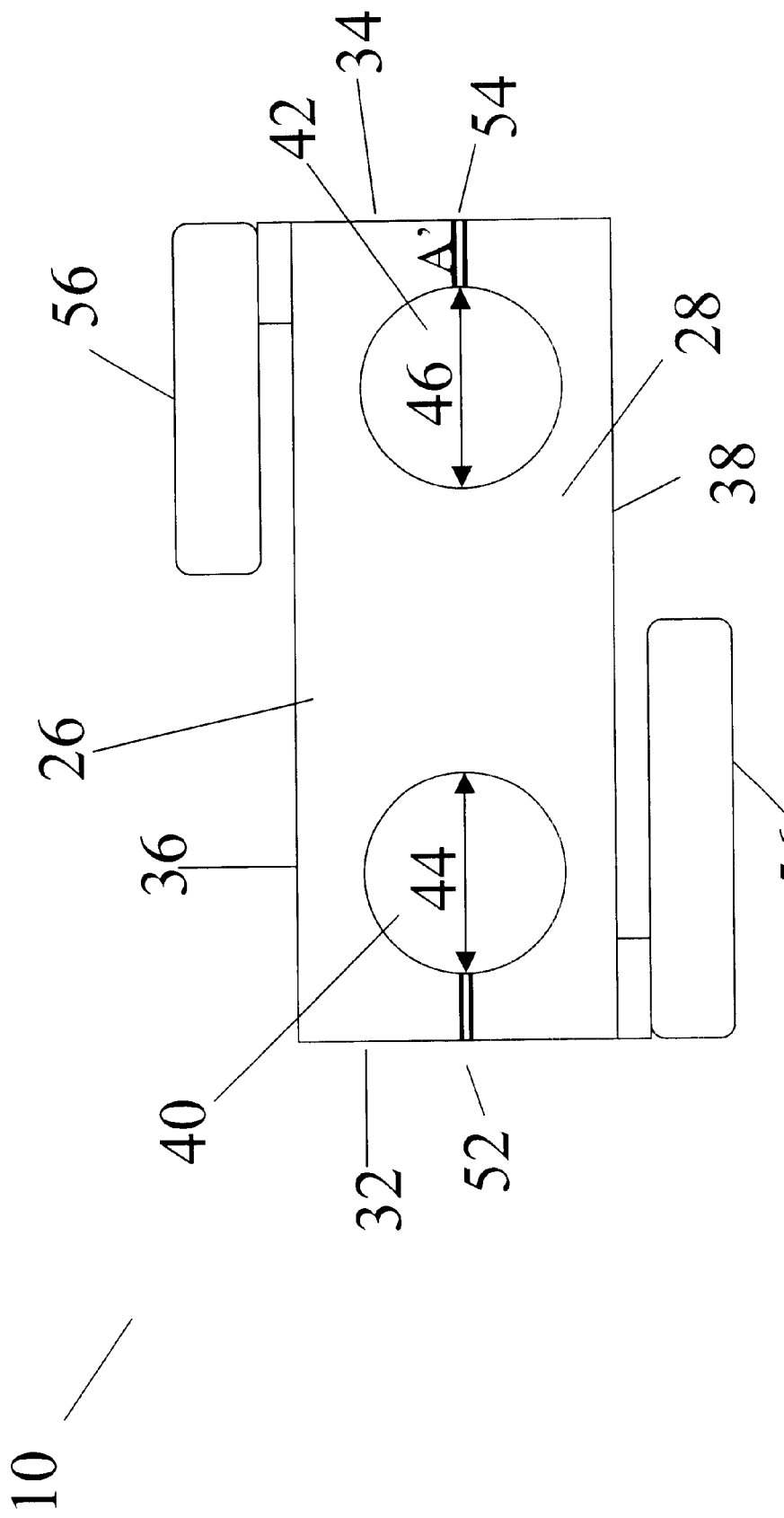
FIG. 6 is a top view of the bicycle accessory mounting apparatus
Figure 7:
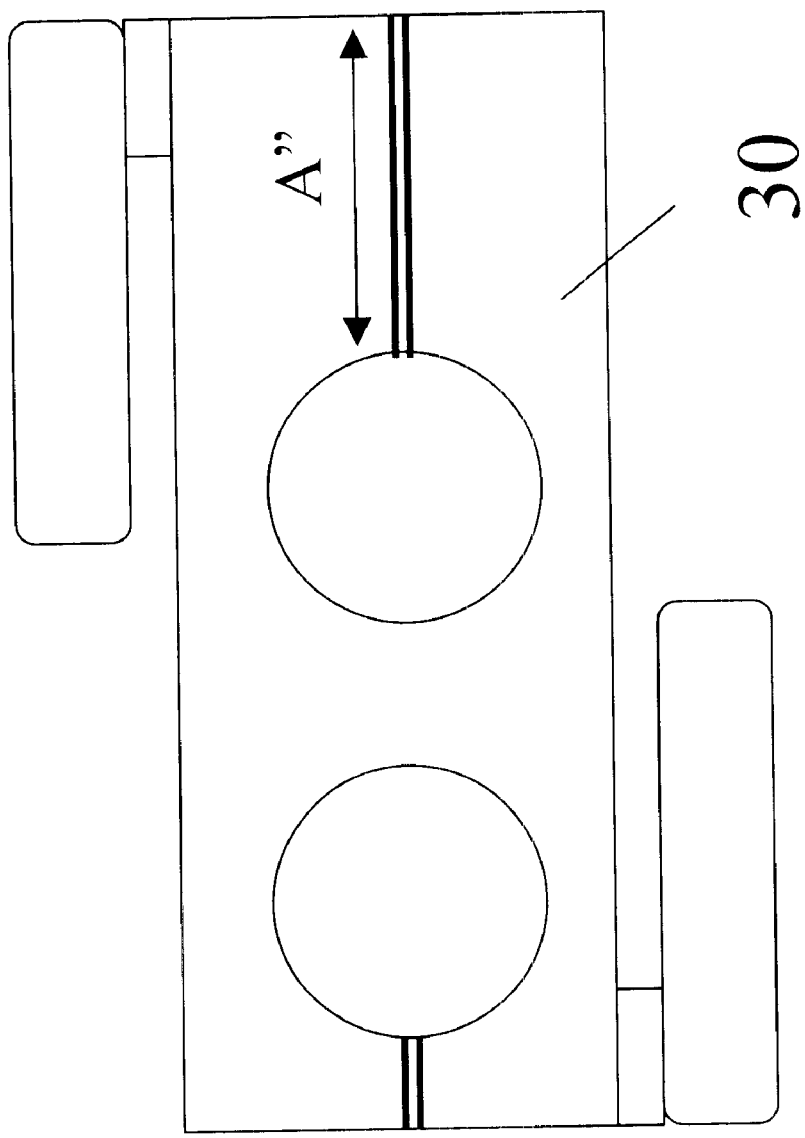
FIG. 7 is a bottom view of the bicycle accessory mount apparatus
Figure 8:
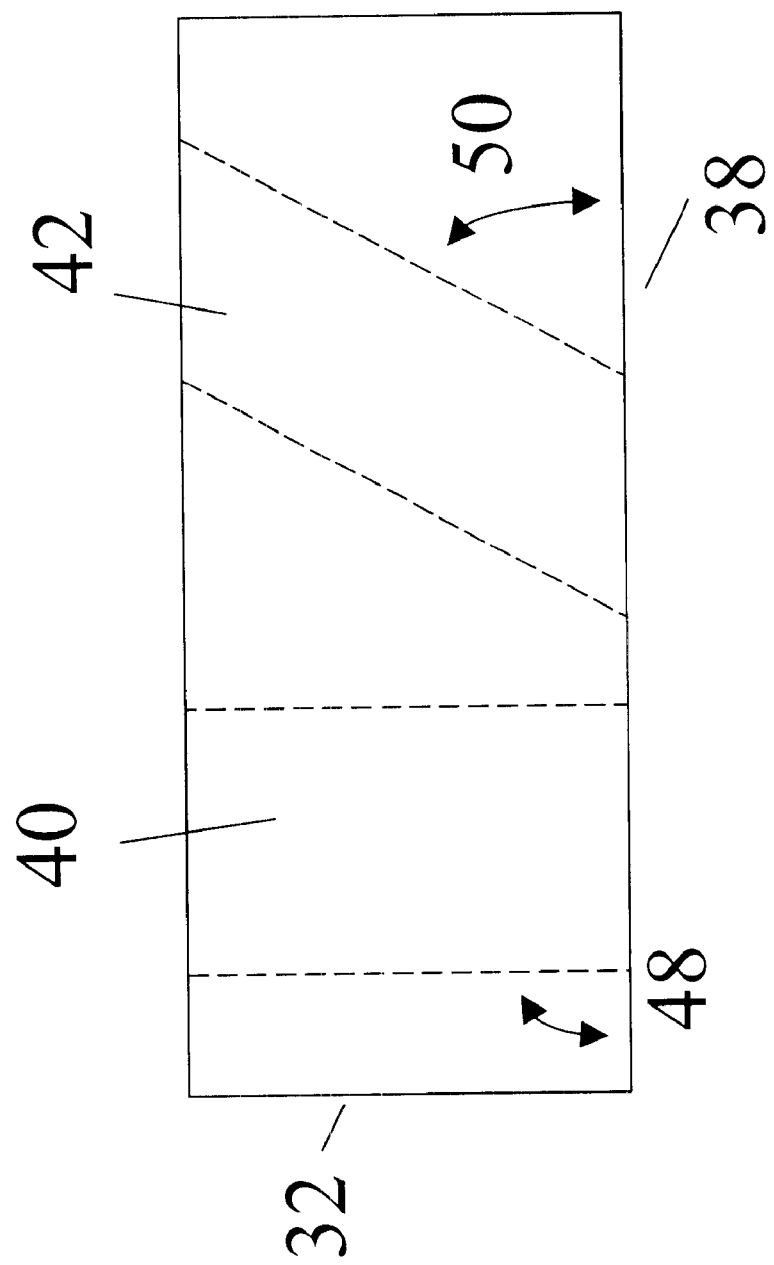
FIG. 8 is an illustration of the first and second hole shaft angles

As illustrated in FIG. 6 and FIG. 7, the bicycle accessory mounting apparatus 10 comprises a block 26 and two locking devices 56. The block 26 is made of suitable material, e.g., aluminum, titanium, stainless steel, graphite, plastic, or other polymer, to withstand the operating load conditions. The block 26 is generally rectangular in shape with a top surface 28, a bottom surface 30, a first end 32, a second end 34, a third side 36, and a fourth side 38. The block 26 further comprises a first hole 40, having a diameter 44, and a second hole 42, having a diameter 46, passing through the block 26 from the top surface 28 to the bottom surface 30. The first hole diameter 44 and second hole diameter 46 are substantially the same as the outer diameters of the bicycle seat post 12 and accessory shaft 18, respectfully. As illustrated in FIG. 8, the first hole 40 is substantially parallel with the first end 32; however, the first hole angle 48 may vary depending on the bicycle seat post 12. The second hole 42 is angled to a predetermined second hole angle 50 relative to the fourth side 38 based on the accessory. Since the angular position of the first hole 40 and the second hole 42 can be determined by one skilled in the art with minimal effort, any angular position of the first hole 40 or the second hole 42 is contemplated and within the scope of the present invention.

In the preferred embodiment, the block 26 further comprises a first gap 52 and a second gap 54, as illustrated in FIG. 6 and FIG. 7. The purpose of the gaps are to provide clearance between the bicycle seat post outer diameter and the first hole diameter between the accessory shaft outer diameter and the second hole diameter during the installation of the bicycle accessory mounting apparatus 10 on to the bicycle seat post 12, and the installation of the accessory shaft 18 into the bicycle accessory mounting apparatus 10, respectively. The first gap 52 extends perpendicularly outward from first hole 40 to the first end 32 and from the top surface 28 to the bottom surface 30. The second gap 54 extends perpendicularly outward from second hole 42 to the second end 34 and from the top surface 28 to the bottom surface 30. Since the angular position of one or both of the holes may not be perpendicular to the top surface 28 and bottom surface 30, the length of the gap from the second hole to the second end will vary on the top and bottom surfaces, as illustrated in by A' and A".

Figure 9:
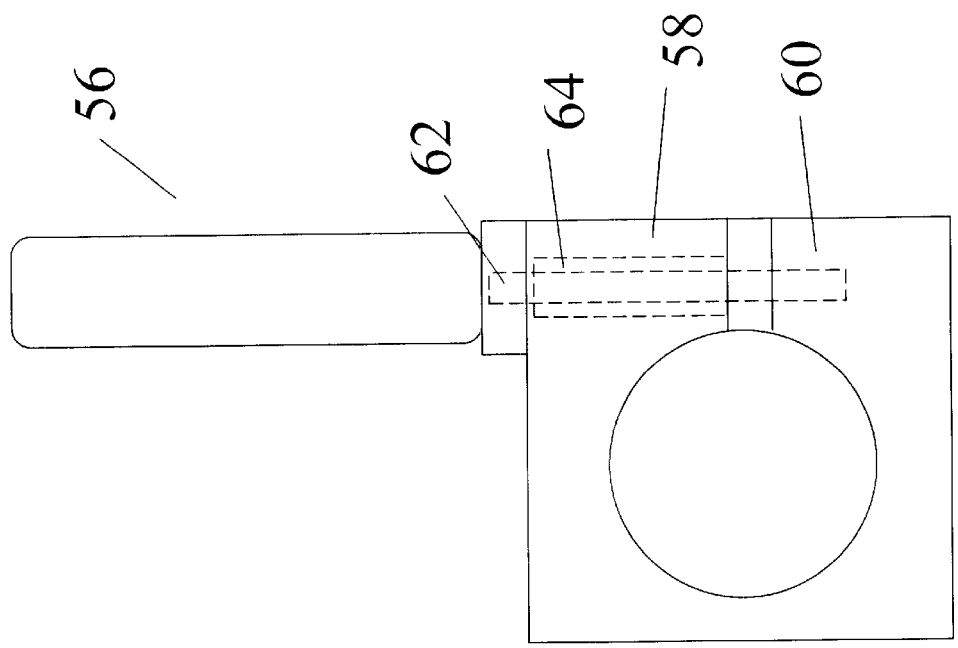
FIG. 9 is a view of the locking device in the open position
Figure 10:
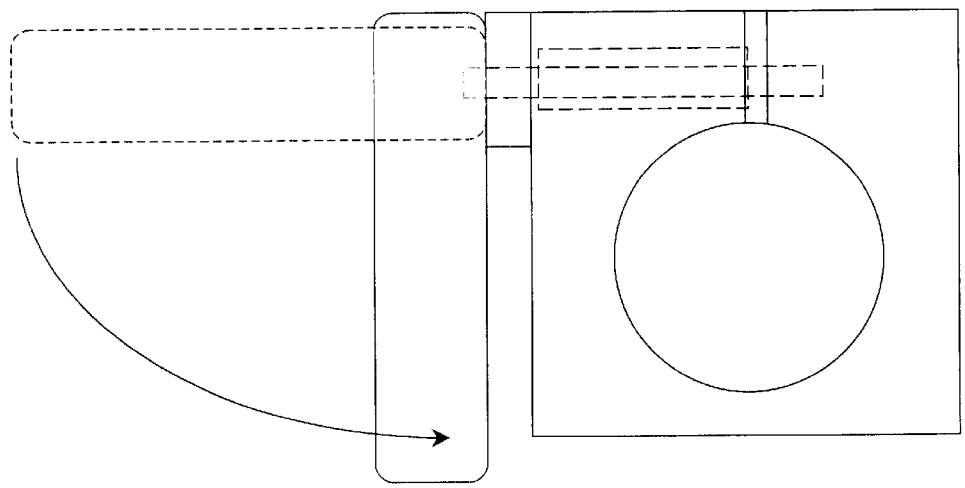
FIG. 10 is a view of the locking device in the closed position

As illustrated in FIG. 6 and FIG. 7 the preferred embodiment includes two locking devices 56, a first hole locking device and a second hole locking device, to secure the bicycle accessory mounting apparatus 10 to the bicycle seat post 12, and to secure the accessory shaft 18 to the bicycle accessory mounting apparatus 10. Here, the locking device 56 is available commercially, e.g. Tranz-x, and will not be discussed in detail. The locking device 56 is positioned on the third side 36 and fourth side 38 at opposing ends. As illustrated in FIG. 9, the gap divides each side into an upper side 58 and lower side 60. The locking device 56 includes a threaded member 62. An internally threaded member hole 64 of sufficient diameter to threadably received the threaded member 62 through the upper side 58, of the top surface 28 and the bottom surface 30, to the gap. The threaded member 62 passes through the internally threaded member hole 64, spans the gap, and is screwed or tapped into the lower side 60. As illustrated in FIG. 10, as the locking device 56 is closed, the threaded member 62 and the lower side 60 are pulled outward towards the locking device 56. Thereby, the gap and holes are closed securing the bicycle accessory mounting apparatus 10 to the bicycle seat post 12 or the accessory shaft 18 to the bicycle accessory mounting apparatus 10. Bicycle accessories, such as a bicycle training handle 20, a child bicycle seat 22, and a cargo carrier 24, can be easily installed and removed without the use of tools.

Figure 11:
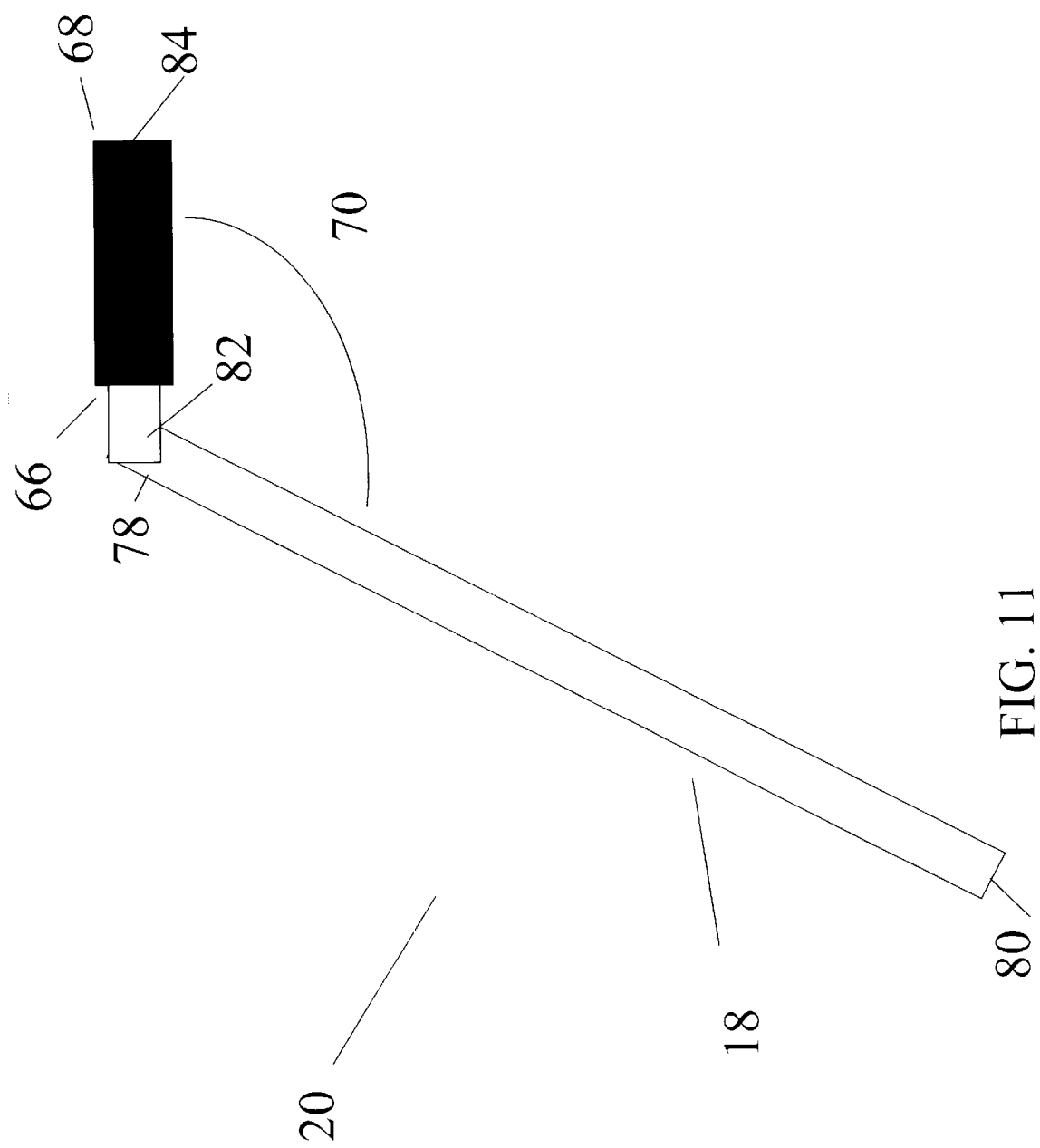
FIG. 11 is a view of the bicycle-training handle

One of the bicycle accessories is a bicycle-training handle 20. As illustrated in FIG. 11, the bicycle-training handle 20 comprises an accessory shaft 18 having a first end 78 and a second end 80, a handle portion 66 having a first end 82 and a second end 84, and a grip 68. The bicycle-training handle 20 is made of suitable material, e.g., aluminum, titanium, stainless steel, graphite, plastic, or other polymer, to withstand the operating load conditions. The accessory shaft 18 critical dimensions, including length and inner diameter, are predetermined based on the selected material and expected height of the trainers. The accessory shaft first end 88 is fixedly connected to the handle portion first end 82 at an angle sufficiently to optimize the ergonomic benefits of the trainer. One skilled in the art with minimal effort can determine the shaft angle 70. Therefore, any shaft angle 70 is contemplated and within the scope of the present invention.

Figure 12:
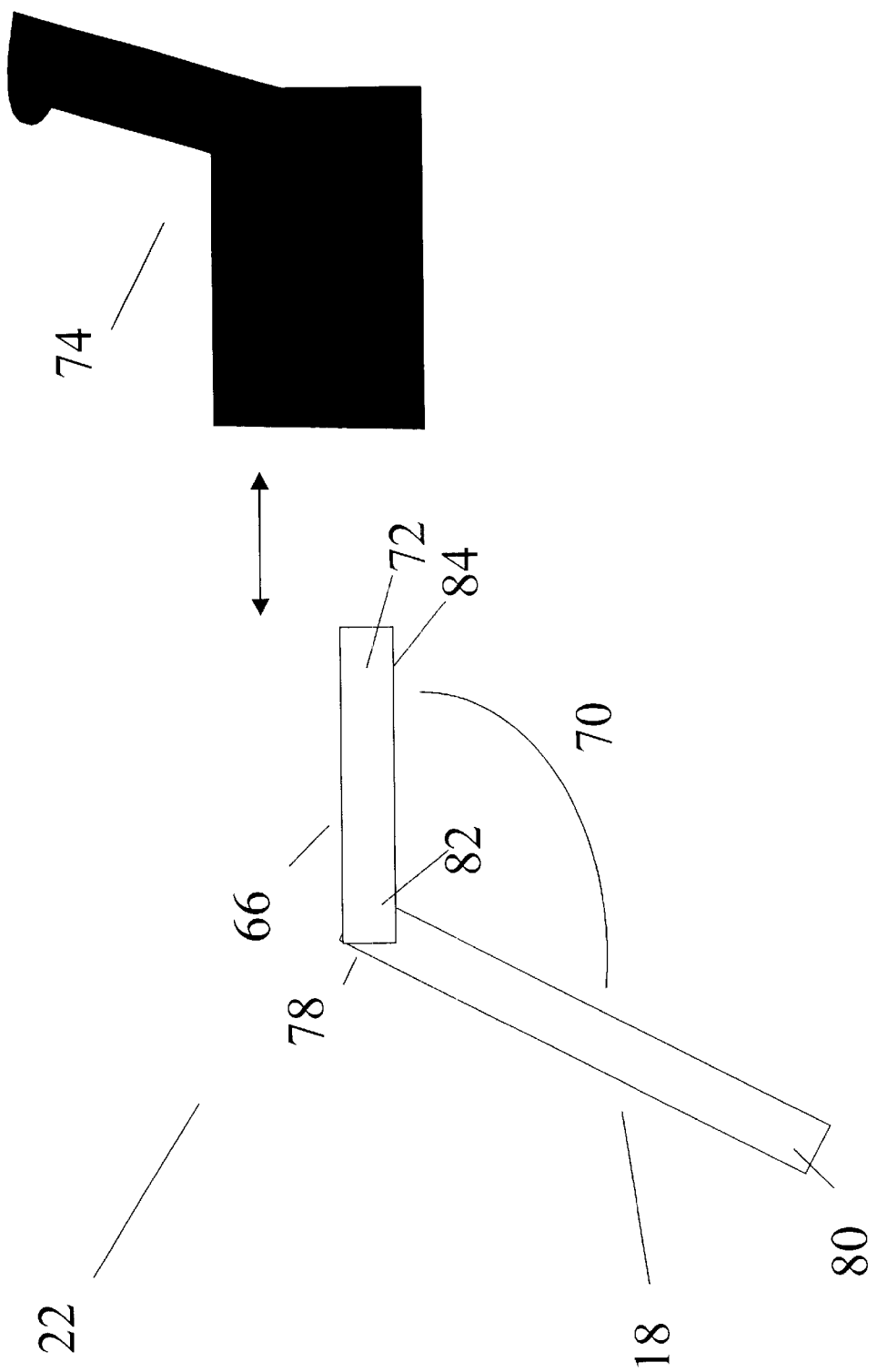
FIG. 12 is a view of the child carrier
Figure 13:
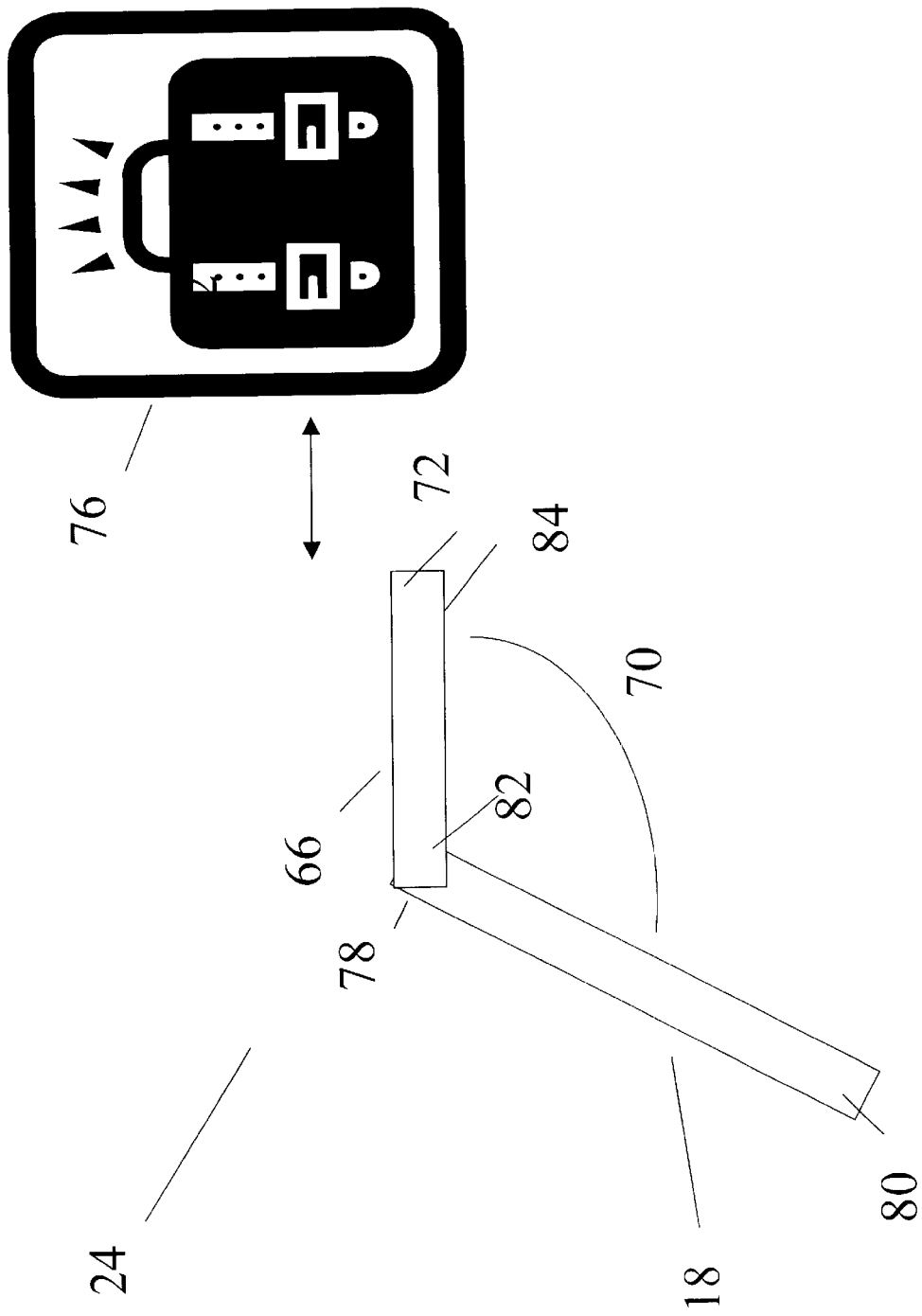
FIG. 13 is a view of the cargo carrier

FIG. 12 and FIG. 13 illustrate the child bicycle seat 22 and cargo carrier 24. The basic structure is the same as the bicycle training handle 20 having an accessory shaft 18, a handle portion 66, and a predetermined shaft angle 70. The accessory shaft 18 critical dimensions, including length and inner diameter, are predetermined based on the selected material and expected weight of the child and cargo. The handle portion 66 includes an accessory-receiving end 72 custom-made to attach a child seat 74 and a cargo container 76 already in the public domain.

The bicycle accessory mounting apparatus 10 can be used in combination with a bicycle-training handle 20 to train a bicycle novice of any age. The locking device 56 provides an easy and convenient way to adjust the height of the bicycle training handle 20 to accommodate the trainer's physical attributes, and to position the bicycle training handle 20 on either side of the bicycle accommodating left and right handed trainers.

To adjust the height and position of the bicycle training handle 20, open the locking device 56 for the second hole 42. The bicycle-training handle 20 is now free to telescope and to rotate clockwise or counter clockwise. Once the desired position is obtained, close the locking device 56 to hold that position.

To position the bicycle training handle 20 on either side of the bicycle accommodating left and right-handed trainers, open the locking device 56 for the first hole 40. The bicycle accessory mounting apparatus 10 is now to rotate clockwise or counter clockwise. This will position the trainer behind the bicycle or on either side of the bicycle. Once the desired position is obtained, close the locking device 56 to hold that position.

Though not disclosed, other bicycle accessories can be mounted and adjusted in a similar fashion.

Accordingly, it can be seen that bicycle accessory mounting apparatus can be easily mounted to a bicycle seat post by removal of the seat or the seat post from the bicycle frame. Bicycle accessories can be easily mounted to the bicycle accessory mounting apparatus without any tools.

Although the description above contains many specificities, these should not be construed as limiting the scope of the invention but as merely providing illustrations of some of the presently preferred embodiments of this invention. Various other embodiments are possible within it's scope.

What is claimed is:

1. A bicycle accessory mounting apparatus for releasably securingly accessory to a support, comprising a block having a plurality of holes, wherein the block is generally rectangular in shape with a top surface, a bottom surface, a first end, a second end, a third side, and a fourth side, wherein the plurality of holes further comprise a first hole, having a diameter, and a second hole, having a diameter, passing through the block from the top surface to the bottom surface, wherein the first hole diameter is substantially the same as an outer diameter of a bicycle seat post, wherein the second hole diameter is substantially the same as an outer diameter of an accessory shaft of the bicycle accessory, wherein the first hole is substantially parallel with the first end of the block, wherein the second hole of the block passes through the block at a predetermined angle, whereby the angle of the second hole is determined based on the bicycle accessory for appropriate positioning of loads and ergonomic considerations of the user, wherein the block further comprises a first gap and a second gap, whereby the first gap provides clearance between the outer diameter of the bicycle seat post and the first hole diameter during the installation of the bicycle accessory mounting apparatus on to the bicycle seat post, whereby the second gap provides clearance between the outer diameter of the accessory shaft of the bicycle accessory and the second hole diameter during the installation of the accessory shaft of the bicycle accessory on to the bicycle accessory mounting apparatus, wherein the second gap extends perpendicularly outward from the second hole to the second end and from the top surface to the bottom surface of the block, wherein the length of the second gap from the second hole to the second end will vary from the top and bottom surfaces since an angular position of the second hole may not be perpendicular to the top surface and bottom surface, wherein the block further comprises two locking devices, a first hole locking device and a second hole locking device, wherein the first hole locking device is positioned on the third side of the block, wherein the second hole locking device is positioned on the fourth side of the block, wherein the first hole locking device and second hole locking devise are positioned at opposing ends of the block, whereby the gaps and holes are closed securing the bicycle accessory mounting apparatus to the bicycle seat post or the accessory shaft of the bicycle accessory to the bicycle accessory mounting apparatus when the locking devices are closed, thereby the accessory shaft of the bicycle accessory can be telescoped to the appropriate height and the bicycle accessory can be quickly and efficiently removed or changed without the use of tools.

2. An apparatus as recited in claim 1 comprising the bicycle accessory.

3. An apparatus as recited in claim 2, wherein the bicycle accessory is a bicycle-training handle.

4. An apparatus as recited in claim 3, wherein the bicycle-training handle comprises:
   (a) the accessory shaft having a first end and a second end, wherein the second end of the accessory shaft is received into the second hole of the block and is fixedly clamped to the block by the closure of the locking device;
   (b) a handle portion, having a first end and a second end, wherein the first end of the handle portion is fixedly attached to the first end of the accessory shaft, the accessory shaft and the handle portion being connected at an angular position sufficient to one another so as to optimize the ergonomic benefits of a trainer; and
   (c) a grip formed on the second end of the handle portion to receive the hand of a trainer.

5. An apparatus as recited in claim 2, wherein the bicycle accessory is a child bicycle seat.

6. An apparatus as recited in claim 5, wherein the child bicycle seat comprises:
   (a) the accessory shaft having a first end and a second end, wherein the second end of the accessory shaft is received into the second hole of the block and is fixedly clamped to the block by the closure of the locking device;
   (b) a handle portion, having first and seconds ends, wherein the first end of the handle portion is fixedly attached to the first end of the accessory shaft, the accessory shaft and the handle portion being connected to one another such that the handle portion is substantially parallel to the ground when the child bicycle seat and child are attached to the bicycle accessory mount apparatus; and
   (c) a child seat fixedly connected on the second end of the handle portion.

7. An apparatus as recited in claim 2, wherein the bicycle accessory is a cargo carrier.

8. An apparatus as recited in claim 7, wherein the cargo carrier comprises:
   (a) the accessory shaft having a first end and a second end, wherein the second end of the accessory shaft is received into the second hole of the block and is fixedly clamped to the block by the closure of the locking device;
   (b) a handle portion, having first and seconds ends, wherein the first end of the handle portion is fixedly attached to the first end of the accessory shaft, the accessory shaft and the handle portion being connected to one another such that the handle portion is substantially parallel to the ground when the cargo carrier with cargo is attached to the bicycle accessory mount apparatus; and
   (c) a cargo container fixedly connected on the second end of the handle portion.

\* \* \* \* \*

UNITED STATES PATENT AND TRADEMARK OFFICE
CERTIFICATE OF CORRECTION

PATENT NO. : 6,431,422 B1
DATED : August 13, 2002
INVENTOR(S) : David B. Moore and Charles L. Moore It is certified that error appears in the above-identified patent and that said Letters Patent is hereby corrected as shown below:

<u>Column 6,</u>
Line 44, "securely" should read -- securing a bicycle --.

Signed and Sealed this

Eighth Day of April, 2003

JAMES E. ROGAN
*Director of the United States Patent and Trademark Office*